United States Patent
Dib et al.

(10) Patent No.: US 11,444,530 B2
(45) Date of Patent: Sep. 13, 2022

(54) REGENERATIVE UNDELAND SNUBBER CIRCUIT FOR HALF-ARM OF AN INVERTER

(71) Applicants: IFP Energies nouvelles, Rueil-Malmaison (FR); MAVEL S.r.l., Pont Saint Martin (IT)

(72) Inventors: Wissam Dib, Suresnes (FR); Denny Chiono, Saint Nicolas (IT); Davide Bettoni, Settimo Vittone to Italy (IT)

(73) Assignee: MAVEL EDT S.P.A., Pont Saint Martin (IT)

( * ) Notice: Subject to any disclaimer, the term of this patent is extended or adjusted under 35 U.S.C. 154(b) by 19 days.

(21) Appl. No.: 15/777,790

(22) PCT Filed: Oct. 26, 2016

(86) PCT No.: PCT/EP2016/075789
§ 371 (c)(1),
(2) Date: May 21, 2018

(87) PCT Pub. No.: WO2017/089061
PCT Pub. Date: Jun. 1, 2017

(65) Prior Publication Data
US 2018/0375426 A1    Dec. 27, 2018

(30) Foreign Application Priority Data
Nov. 23, 2015 (FR) ..................... 15/61.212

(51) Int. Cl.
*H02M 1/34* (2007.01)
*H02M 7/00* (2006.01)
(Continued)

(52) U.S. Cl.
CPC ............. *H02M 1/34* (2013.01); *H02M 7/003* (2013.01); *H02M 7/5387* (2013.01);
(Continued)

(58) Field of Classification Search
CPC ........ H02M 1/34; H02M 7/003; H02M 5/458; H01L 25/07
See application file for complete search history.

(56) References Cited

U.S. PATENT DOCUMENTS

| 2005/0225271 | A1* | 10/2005 | Anwar .................. H02P 25/024 318/400.28 |
| 2012/0147641 | A1 | 6/2012 | Yamaguchi et al. |

FOREIGN PATENT DOCUMENTS

| CN | 1619936 A * | 5/2005 | ............ H02M 5/458 |
| DE | 10062075 A1 * | 6/2002 | .............. H02M 1/34 |

(Continued)

OTHER PUBLICATIONS

Runge et al Some Aspects of the Circuit Design of High Power GTO Converters, Proceedings of the European Conference on Power Electronics and Applications. (EPE) aaCHEN, Oct. 9-12, 1989, Dusseldorf, EPE Secretariat, DE, vol. 3, Oct. 9, 1989 (Oct. 9, 1989), pp. 1555-1560, XP000143585 (Year: 1989).*

(Continued)

*Primary Examiner* — Cortez M Cook
(74) *Attorney, Agent, or Firm* — Fitch, Even, Tabin & Flannery LLP

(57) ABSTRACT

The present invention is a power module for a system for converting a direct electrical power into a three-phase electrical power. The power module according to the invention comprises two inputs (E1, E2), an output (S), two switches (1), two diodes (D), and two capacitors (Cs, Cov) and to a conversion system comprising such a power module.

34 Claims, 4 Drawing Sheets

(51) Int. Cl.
  *H02M 7/5387*  (2007.01)
  *H02M 7/5395*  (2006.01)
  *H02P 27/08*   (2006.01)
  *H02M 1/00*    (2006.01)

(52) U.S. Cl.
  CPC .......... *H02M 7/5395* (2013.01); *H02P 27/08* (2013.01); *H02M 1/0058* (2021.05); *H02M 1/346* (2021.05); *Y02B 70/10* (2013.01)

(56) References Cited

FOREIGN PATENT DOCUMENTS

| | | | |
|---|---|---|---|
| DE | 10062075 A1 | 6/2002 | |
| JP | H03145756 A | 6/1991 | |
| JP | 2646763 B2 * | 8/1997 | ............. H01L 25/07 |
| WO | 2011016854 A1 | 2/2011 | |

OTHER PUBLICATIONS

International Search Report for PCT/EP2016/075789, dated Jan. 24, 2017; English translation submitted herewith (8 pgs.).

Runge W et al: "Some Aspects of the Circuit Design of High Power GTO Converters", Proceedings of the European Conference on Power Electronics and Applications. ( EPE ) . AACHEN, Oct. 9-12, 1989, Dusseldorf, EPE Secretariat, DE, vol. 3, Oct. 9, 1989, pp. 1555-1560.

Xiangning He et al: "Bridge leg snubbers for GTO thyristor inverters", Industry Applications Conference, 1995. Thirtieth IAS Annual Meeting, IAS '95., Conference Record of the 1995 IEEE Orlando, FL, USA Oct. 8-12, 1995, New York, NY, USA, IEEE, US, vol. 2, Oct. 8, 1995, pp. 1038-1044.

Shakweh Y et al: "Snubber energy recovery for a high power traction drive", Electric Railways in a United Europe, 1995., International Conference on Amsterdam, Netherlands, London, UK, IEE, UK, Jan. 1, 1995, pp. 92-96.

Taufiq J A: "Advanced inverter drives for traction" Jan. 1, 1993, Jan. 1, 1993, pp. 224,228.

* cited by examiner

REGENERATIVE UNDELAND SNUBBER CIRCUIT FOR HALF-ARM OF AN INVERTER

CROSS REFERENCE TO RELATED APPLICATIONS

Reference is made to PCT/EP2016/075789 filed Oct. 26, 2016, and French Application No. 15/61.212 filed Nov. 23, 2015, which are incorporated herein by reference in their entirety.

BACKGROUND OF THE INVENTION

Field of the Invention

The present invention relates converters for converting electrical energy, notably for high-speed and/or variable speed electrical machines.

Description of the Prior Art

A solid-state converter is a system which converts one electrical signal into another electrical signal having different characteristics. For example, a converter can convert an alternating voltage into another alternating voltage with at least one of a different frequency and amplitude. This is then termed an alternating/alternating or AC/AC converter. According to another example, a converter can convert an alternating voltage into a direct voltage. This is then termed alternating/direct or AC/DC converter. For the reverse direct/alternating conversion, the term DC/AC converter applies. According to the final example, a converter can convert a direct voltage into a direct voltage of different voltage, which is then called DC/DC converter. The converters can be reversible or non-reversible. Generally, the conversion is implemented by controlled switches.

To drive electrical machines, notably electrical machines with permanent magnets, from electrical energy storage system(s) (for example a battery), it is necessary to convert the direct electrical energy into three-phase alternating energy. This conversion can be done by a DC/AC converter. Such a converter must provide three sinusoidal voltages phase-shifted by 120° electrically relative to one another, the amplitude of which depends directly on the torque demand (but also on the speed of rotation), and the frequency of which depends solely on the speed of rotation of the electrical machine linked to the converter.

Conventionally, a DC/AC converter comprises three switching arms. Each switching arm comprises two controlled switches and two diodes placed in parallel to the controlled switches. Depending on the load current demand, an arm may have several "sub-arms" in parallel. The phases of the electrical machine are linked to the mid-point of each arm. Each arm is controlled separately by driving the opening and the closing of the switches over chopping periods, to form a three-phase signal.

FIG. 1 illustrates such a conventional DC/AC converter. The direct voltage from the electrical energy storage is indicated Udc. The three-phase motor M is represented schematically by three coils, powered by the currents Ia, Ib and Ic. The converter comprises three switching arms A, B, and C with each switching arm A, B, and C is linked to a phase of the electrical machine M. Each switching arm comprises two switches 1 and two diodes 2. The switching arms A, B, C are arranged in parallel, between the two direct input phases of the voltage converter Udc. The output phases of the switching arms A, B, C are linked to the mid-point (between the two switches) of the switching arms.

FIG. 2 represents the control signal COM for the switches with a constant duty cycle of 50% with the voltage Udc and the current Ic being at the terminals of a switch, for a conventional DC/AC converter (as described above with reference to FIG. 1). For the control signal COM, the low part of the pulse corresponds to the switch being open, and the high part of the pulse corresponds to the switch being closed. This switching case is called hard or «on/off» switching. Note that, for this design of the converter, overshoots of the voltage Udc and of the current Io occur. The current Io corresponds to the permanent value of Ic, and corresponds to the current sent to the electrical machine.

Thus, the main drawbacks with this conventional converter design are as follows:

Switching Losses: This design exhibits significant switching losses, which tend to make its use incompatible with high switching frequencies and therefore for electrical machines used at very high speeds, Current/voltage Overshoot: as shown in FIG. 2, this strategy exhibits voltage and current overshoots upon the instantaneous switching of the switch. Thus, this type of driving requires a margin to be taken on the voltage and the current of the different components in the design of the converter (also called inverter). This involves an overdimensioning of the components used, (for example: for a DC bus voltage of 300 volts, an IGBT switch with a nominal voltage of 600 volts is used), and significant electromagnetic emissions (EMC).

By starting from the drawbacks of the "hard switching" strategy (losses, incompatibility with high speed motors), a so-called soft switching design has been developed. Thus, to limit the overshoots of the current and of the voltage on the switches, a coil and a capacitor are added to the preceding circuit. The coil modulates the variation of the current di/dt (turn on), and the capacitor modulates the variation of the voltage dv/dt (turn-off). Furthermore, and in order to ensure the operation of the circuit, and therefore a zero energy balance, a resistor is added in the circuit between the voltage of the energy source used and the capacitive circuit. This resistor makes it possible to ensure the operation of this circuit and to lower the voltage back at the terminal of the capacitive circuit. Such a DC/AC converter design is described notably in the patent application WO 11016854.

FIG. 3 represents a simplified diagram of a switching arm (with two switches 1) with a capacitor Cs, a coil Ls, a resistor R and a capacitor Cov for soft switching. This circuit is known as "Undeland Snubber". The voltage Udc corresponds to the voltage at the terminals of the direct electrical energy storage. The coil Ls is placed between a direct input phase Udc and the switching arm A. A branch starts from the junction between the coil Ls and the switching arm A which comprises two diodes D, and is at a junction between the resistor R and the capacitor Cov. The other end of the resistor R is connected to the direct input phase of the converter. The other end of the capacitor Cs is connected to the alternating output phase of the switching arm A. The other end of the capacitor Cov is connected to ground. The capacitor Cs makes it possible to modulate the changing of the voltage at the terminals of the switch. This capacitor stores a part of the energy due to the soft switching of the switches. The other part of this energy is stored in a higher value capacitor Cov. Next, the energy stored in the capacitor is returned to the storage system used (battery) through the resistor. The coil Ls makes it possible to modulate the changing of the current at the terminals of the switch. In fact, the energy created by the coil Ls is not entirely stored in the capacitor Cs, hence the need for a second capacitor Cov of higher value than Cs. The resistor ensures the operation of the system and makes it possible to lower the voltage Vrec back.

FIG. 4 presents, in a manner similar to FIG. 2, the switching signal COM, the changing of the voltage Udc and the current Ic of the switch upon a so-called "soft" switching. For the control signal COM, the low part of the pulse corresponds to the switch being open, and the high part of the pulse corresponds to the switch being closed. In this figure, it will be noted that the voltage Udc and current Ic overshoots are reduced compared to the so-called "hard" switching.

The advantages of soft switching are:
Lower Switching Losses. This design of the converter is compatible with high switching frequencies, and can be used to drive electrical machines at high speeds,
Smaller Voltage and Current Overshoot on the Switch. There no longer is a need to overdimension the components; and
Changing of the Voltage and of the Current at the terminals of the switches upon transition is modulated by the choice of Ls and Cs respectively.

This design of the converter requires a particular arrangement of the different electrical components, which makes the mounting thereof long and complex.

SUMMARY OF THE INVENTION

To mitigate these drawbacks, the present invention relates to a power module for a system for converting a direct electrical power into three-phase electrical power. The power module according to the invention comprises two inputs, one output, two switches, two diodes, and two capacitors. Thus, the power module for a conversion system can be standardized, allowing the conversion system to be mounted simply and rapidly. Furthermore, the power module according to the invention is adapted for soft switching, through the presence of the capacitors, which makes it possible to minimize the switching losses, and to limit the voltage and current overshoots.

The invention relates to a power module for a system for converting a direct electrical power into three-phase electrical power. The power module comprises two inputs which can be connected to the direct inputs of the conversion system, two switches placed in series between the inputs, and a first output arranged between the two capacitors. The first output provides an alternating current phase output and is able to be connected to an alternating output phase of the conversion system. The power module further comprises two diodes and two capacitors.

According to an embodiment of the invention, the two diodes are mounted in series, and are connected to a first input of the module and to a second output of the module with the second output providing energy recovery and being able to be connected to an energy recovery module of the conversion system.

Advantageously, a first voltage modulation capacitor is connected between a point contained between the diodes and the first output.

According to one implementation, a second capacitor is connected between the second output of the module and to a second input of the module.

Preferably, the switches are of MOSFET or IGBT type.

According to a feature of the invention, the voltage modulation capacitor has a capacitance of between 4 and 15 nF.

According to a possible design, the second capacitor has a capacitance of between 500 and 5000 nF.

According to one embodiment, said module forms a block that can be mounted on a board of a conversion system.

Advantageously, the block comprises means for fixing the module.

Preferentially, the fixing means comprise at least one notch for the passage of a screw.

Furthermore, the invention relates to a system for converting a direct electrical power into three-phase electrical power comprising three switching arms. Each switching arm comprises a power module according to one of the preceding features.

Advantageously, each switching arm comprises two or three power modules according to one of the preceding features.

According to one feature, the conversion system comprises an energy recovery module and at least one current modulation coil.

Furthermore, the invention relates to a motor system comprising at least one electrical energy storage and one three-phase electrical machine. The motor system comprises a conversion system according to one of the preceding features, for converting the direct electrical energy from the electrical energy storage into three-phase alternating electrical energy for the electrical machine.

BRIEF DESCRIPTION OF THE DRAWINGS

Other features and advantages of the system according to the invention will become apparent on reading the following description of nonlimiting exemplary embodiments, with reference to the figures attached and described hereinbelow.

FIG. 5b illustrates a resistive equivalent model of the electrical energy recovery module of FIG. 5a.

DETAILED DESCRIPTION OF THE INVENTION

Figure 1:
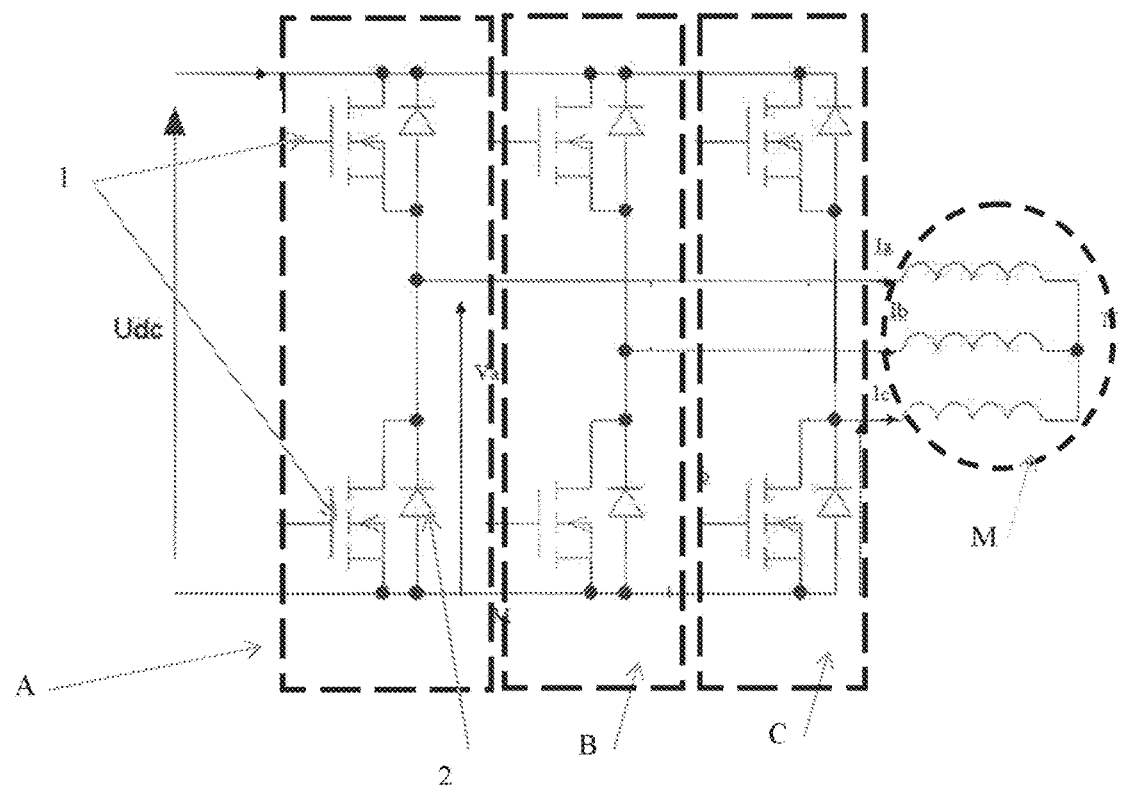
FIG. 1, already described, illustrates a conventional DC/AC converter, with hard switching, according to the prior art.
Figure 2:
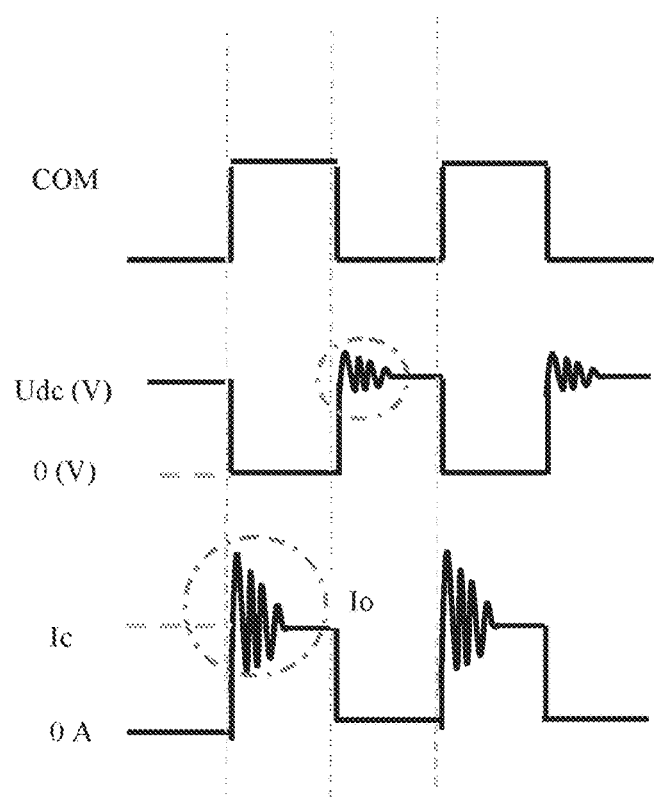
FIG. 2, already described, illustrates the switching signal, the voltage and the current in a phase for a DC/AC converter according to the design of FIG. 1.

The present invention relates to a power module for a system for converting a direct electrical power into three-phase electrical power. The power module serves as a switching arm for the conversion system. The power module comprises:
- two inputs, that can be connected to the DC inputs of the conversion system, the first input can be linked to a positive voltage, and the second input can be linked to the ground;
- two switches mounted in series between the two inputs, the switches can be controlled, so as to provide an alternating output current;
- one output, that can be connected to an alternating output phase of the conversion system, the output is connected at a point between the two switches;
- two diodes, allowing current to pass in one direction; and
- two capacitors, a first capacitor called voltage modulation capacitor (which allows the modulation of the voltage variation for the soft switching) and a second capacitor (which makes it possible to store the energy created which is not stored in the first capacitor in the modulation of the voltage).

Such a power module is compatible with a wide operating voltage range.

According to one embodiment of the invention, the power module contains only these electronic components: two switches, two diodes, and two capacitors. For this embodiment, only the second capacitor can be formed by a parallel association of several capacitors (for example two or three capacitors).

Furthermore, the power module can be adapted to be connected to an electrical energy recovery module. In this case, the power module can comprise a second output that can be connected to the electrical energy recovery module. This second output can be connected to a diode.

According to one embodiment of the invention, the diodes of the power module are mounted in series. The diodes can be connected to a first input of the power module. For example, the input linked to the positive voltage. In the case where the power module comprises a second output for an electrical energy recovery module, the diodes are connected to this second output.

Furthermore, the voltage modulation capacitor can be mounted between a point located between the two diodes and the first output.

Furthermore, the second capacitor can be mounted between the second output and the second input of the power module, on the input of the power module, on which the diodes are not mounted. For example this second input can correspond to the ground.

According to a feature of the invention, the switches can be switches of MOSFET (Metal Oxide Semiconductor Field Effect Transistor) and/or IGBT (Insulated Gate Bipolar Transistor) type, according to the DC bus input voltage. For the high voltage, IGBT switches can be used. For the low voltage, MOSFET switches can be used.

Preferably, the switches can be controlled by a pulse width modulation (PWM) method. The general principle of this modulation method is that, by applying a succession of discrete states for well chosen durations, it is possible to obtain, on average over a certain period, any intermediate value.

For the modulation of the variations of the voltage, the first voltage modulation capacitor can have a value of between 1 and 15 nF which is preferably between 2 and 10 nF.

The second capacitor preferably has a higher capacitance than the first capacitor. The second capacitor can have a value of between 500 and 5000 nF which is preferably between 600 and 2,500 nF. According to a variant embodiment of the invention, the second capacitor can be formed by several capacitors associated in at least one of parallel and series. Advantageously, to limit the bulk, the second capacitor can be formed by three identical capacitors (of the same capacitance) associated in parallel.

Advantageously, the power module can be in a block, so as to facilitate the assembly, compactness and standardization thereof. The block can comprise a support, a plate comprising a printed circuit, and the electronic components (switches, diodes, capacitors) of the power module. The plate can be a printed circuit. The electronic components are mounted on the plate. The plate is mounted on the support. The block can be configured to be mounted on board of a conversion system. The block can have a substantially parallelepipedal form.

According to a variant embodiment of the invention, the block can comprise several means for fixing or attaching the module onto the board of a conversion system. The fixing or attaching means can notably be at least one notch provided for the passage of a screw. The notch can be provided in at least one of the support and the plate of the block. The notch can be of substantially oblong. The fixing or attaching means can also comprise at least one slit or one protrusion, which allows fixing by snap-fitting (clipping) or positioning of the block.

The block can also comprise means for fixing or attaching several modules together, so as to be able to associate several modules together, notably for the case where the currents are high, which makes it possible to produce the switching arm of a conversion system without employing components that have high specific characteristics and that are expensive.

The power module according to the invention does include electrical energy recovery, or a coil for modulating the current variation, allowing for soft switching.

Figure 6:
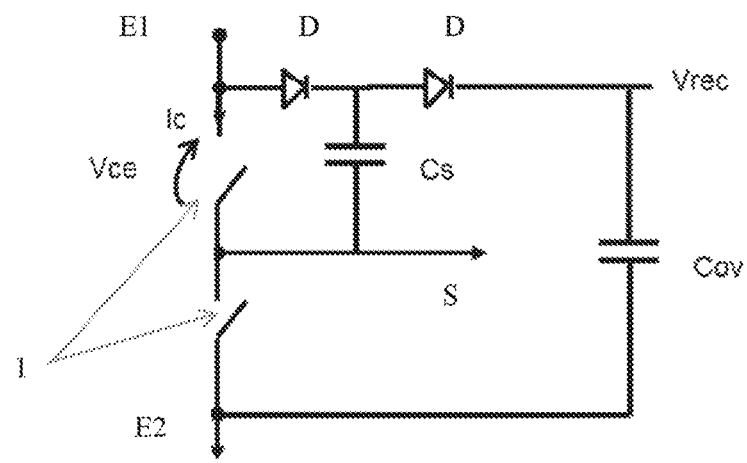
FIG. 6 illustrates an electrical circuit diagram of a power module according to an embodiment of the invention.

FIG. 6 illustrates, in a nonlimiting manner, an electrical circuit diagram of a power module according to an embodiment of the invention. The power module comprises two inputs E1 and E2 for connection to the direct inputs of the conversion system. The input E1 can correspond to the positive voltage input, and the input E2 can correspond to the ground. Between the two inputs E1 and E2, two controlled switches 1 are mounted in series. Between the two switches 1, the output S is connected, this output S is for connection to an output phase of the conversion system. Two diodes D are mounted in series between the input E1 and the second output Vrec which can be connected to an electrical energy recovery module. A first capacitor Cs, providing the voltage modulation, is connected at a point between the two diodes D and the first output S. A second capacitor Cov is connected between the second output Vrec and the second input E2.

Figure 7:
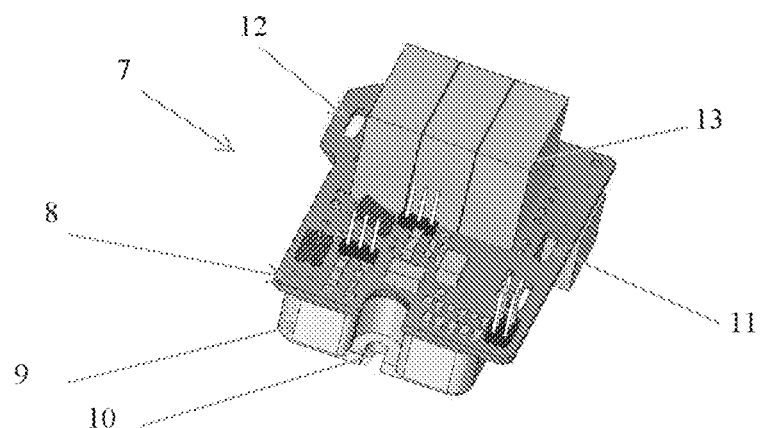
FIG. 7 illustrates the design of a power module according to an embodiment of the invention.

FIG. 7 illustrates, schematically and in a nonlimiting manner, a power module according to an embodiment of the invention. The module is substantially in the form of a block 7. The block 7 comprises a plate 8, having a printed circuit on which various electronical components are mounted. The plate 8 has a substantially rectangular form. The plate 8 is mounted on a support 9. The support 9 has a substantially rectangular parallelepipedal form. The plate 8 and the support 9 comprise several fixing or attaching means which are a notch 10 provided for the passage of a screw, two slits 11 and 12 for fixing or attaching by snap-fitting and for positioning of the block. Electronic or electrical components (represented schematically) are mounted on the plate 8 on the side opposite the support 9. Among the electronic components is the second capacitor Cov which is formed by three capacitors 13 associated in parallel.

Furthermore, the present invention relates to a DC/AC conversion system (converter) for converting a direct electrical energy into three-phase alternating electrical energy. Advantageously, the conversion system according to the invention can be two-way (reversible). Thus, by use of the conversion system according to the invention, three-phase alternating electrical current can be converted into direct electrical current.

Conventionally, the conversion system according to the invention comprises three switching arms, a direct input phase, and three alternating output phases. Each switching arm comprises a power module according to the invention. Thus, the conversion system comprises at least three power modules. According to an embodiment of the invention, each switching arm can comprise a plurality, preferably two, three or four power modules associated in parallel. This association of power modules makes it possible to increase the characteristics of the electrical current, notably the intensity or magnitude of the electrical current. For example, if a DC/AC converter is desired with a current of 300 A Rms (root mean square value), three power modules can be associated in parallel allowing a current of 100 A Rms. The fact that separate and standardized power modules are used to form the switching arms makes it possible to simplify the mounting and the design of the converter.

According to the invention, the conversion system further comprises a voltage and current modulation circuit. The voltage and current modulation circuit allows for soft switching which makes it possible to limit the switching losses and to limit the voltage and current overshoots on the switches. The modulation circuit comprises a coil, which modulates the current variation, and a first and a second capacitor per power module, to modulate the voltage variation. The capacitors of the modulation circuit are included in the power modules. The first capacitor allows for the modulation of the voltage variation, and the second capacitor makes it possible to store the energy created by the coil and which is not stored by the first capacitor.

According to one embodiment of the invention, the conversion system further comprises an electrical energy recovery module. Thus, the conversion system does not include any resistor, in which energy is dissipated for the prior art. On the contrary, the electrical energy recovery module, which replaces the resistor, makes possible to recover energy available or created in the so-called soft switching, by recovering the energy available in the soft switching and by sending it to electrical energy storage (for example a battery), connected to the direct phases of the conversion system. Thus, the electrical losses are greatly reduced. The electrical energy recovery module is linked to the switching arm and to the modulation circuit.

The electrical energy recovery module can comprise at least one inductor, at least one diode, at least one capacitor and at least one switch. The switch is controlled to allow the recovery of energy and the transfer thereof to the electrical energy storage.

According to a variant embodiment of the invention, the electrical energy recovery module can comprise three branches linked at a junction point with:
  a first branch comprising a switch;
  a second branch comprising a diode; and
  a third branch comprising an inductor.

Thus, the printed circuit board of the conversion system can be modified specifically to use the design of a soft switching converter compatible with high switching frequencies, while minimizing the losses due to the passive circuit added to ensure the operation of the modulation circuit.

Figure 5A:
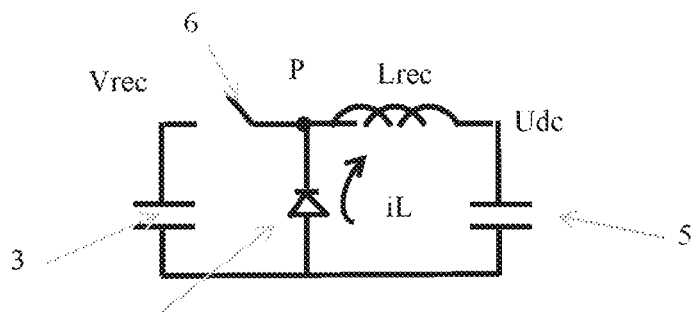
FIG. 5a illustrates an exemplary embodiment of the electrical energy recovery module for a converter according to an embodiment of the invention.

FIG. 5a represents, schematically and in a nonlimiting manner, such an electrical energy recovery module. The electrical energy recovery module comprises three branches linked at a junction point P, with:
  a first branch with a switch 6;
  a second branch comprising a diode 4 (in which a current iL dependent on the voltage at its terminals circulates); and
  a third branch comprising an inductor Lrec.

In FIG. 5a, the capacitor 5 represents the capacitance of the electrical energy storage (battery) and is not a component of the recovery module. The capacitor 5 is placed between the inductor Lrec and the ground.

Furthermore, the capacitor 3 represents the capacitance Crec, and it is a component of the recovery module. The capacitor 3 is placed between the switch and the ground.

The diode 4 is placed between the junction point of the three branches and the ground.

By driving the switch (its duty cycle), it is possible to drive the current iL which circulates between Vrec and Udc (the current sent to the battery).

Thus, by considering the assembly formed by the recovery module and the capacitor of the electrical energy storage, the assembly is formed by three parallel branches, placed between the point P and the ground, with:
  a first branch comprising the switch 6 and the capacitor 3;
  a second branch comprising a diode 4; and
  a third branch comprising the inductor Lrec and the capacitance 5 of the electrical energy storage.

When the switch is closed, the diode is in a blocked mode and the current iL which circulates in the coil Lrec (represented in FIG. 5a) is equal to $$\frac{V_{rec} - U_{dc}}{L_{rec}}.$$

When the switch is open, the diode is in a conducting mode and the current iL which circulates in the coil Lrec (represented in FIG. 5a) is equal to $$\frac{-U_{dc}}{L_{rec}}.$$

Thus, by driving the opening and closing time of the switch, it is possible to control the mean value of the current iL, and have operation equivalent to a resistive circuit.

Figure 5B:
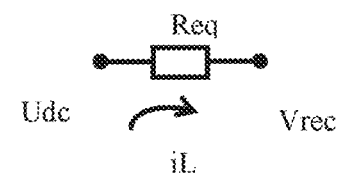

FIG. 5b represents, in a nonlimiting manner, an equivalent electrical circuit diagram of the electrical energy recovery module illustrated in FIG. 5a. Thus, the electrical energy recovery module is equivalent to an equivalent resistance Req, in which a current iL circulates, but without dissipation of the electrical energy.

For this variant embodiment, the mean current in this circuit can be expressed in the following form:

$$\bar{i} \cong \frac{V_{rec} - U_{dc}}{L_{rec}} \frac{T}{2} = \frac{V_{rec} - U_{dc}}{2 * L_{rec} * F_{SW}} \cong \frac{V_{rec} - U_{dc}}{R_{eq}}$$

with:

T being the switching period of the switch;
Vrec being the harvesting voltage;
Udc being the direct input phase voltage;
Lrec being the inductance of the recovery module;
Req being the equivalent resistance; and
Fsw being represents the switching frequency of the switches.

Preferably, such an energy recovery module is mounted in the conversion system equipped with the modulation circuit, such that the electrical energy recovery module is arranged between a direct input phase of the conversion system and the junction between the switching arm and the capacitor of the modulation circuit. For the embodiment of FIG. 5a, the electrical energy recovery module can be connected such that:

the point of the recovery module linked to the direct input phase (of voltage Udc) of the conversion system corresponds to the point of the third branch of the recovery module between the inductor Lrec and the second capacitor 5 (this capacitor is the capacitance of the battery), and the point of at least one of the recovery module linked to the junction between the switching arm (of voltage Vrec) and the capacitor of the modulation circuit corresponds to the point of the first branch of the recovery module between the switch 6 and the first capacitor 3.

Figure 8:
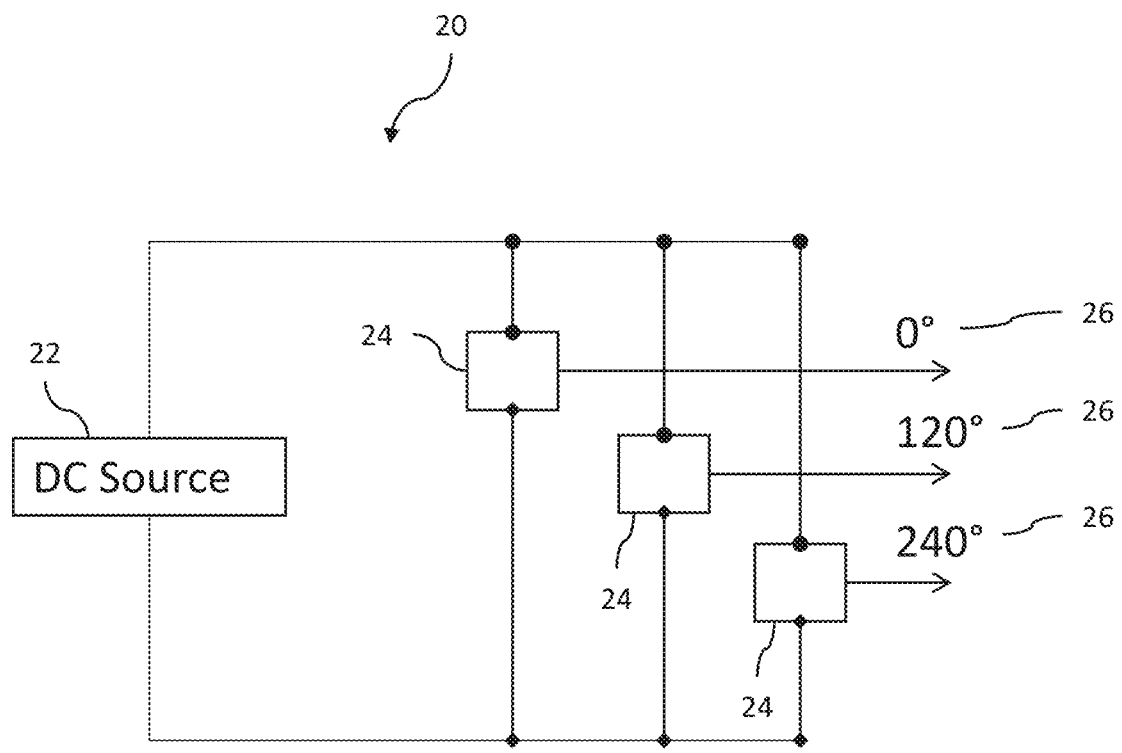
FIG. 8 illustrates an embodiment of a system for converting direct current into three phase alternating electrical current having three switching arms each including the power module and the electrical energy recovery module.

FIG. 8 illustrates a diagram of a system 20 for converting DC into three phase AC having substantially reduced losses from the switching process occurring during operation of an inverter. The system 20 includes a DC source 22 which provides a DC input to three switching arms 24 which are of identical construction. Each switching arm includes an electrical energy recovery module as described with respect to FIG. 5a which is contained in a power module as described above with respect to FIG. 6.

The conversion system according to the invention makes it possible to drive electrical machines, for all kinds of applications, in particular for electrical machines rotating at very high speeds with a high inverter (converter) efficiency.

The converter according to the invention can be provided for an embedded use, in particular in a vehicle, notably land, aeronautical or naval.

The conversion system according to the invention can also be used in non-embedded electrical energy production systems, such as turbines, micro-turbines or wind turbines.

Furthermore, the present invention relates to a motor system comprising at least one electrical energy storage, for example a battery, and one three-phase electrical machine, for example a permanent magnet electrical machine. The motor system comprises a conversion system according to one of the embodiments described above, to convert direct electrical energy from the electrical energy storage into three-phase alternating electrical energy for the electrical machine, and possibly vice versa. Thus, by virtue of the conversion system, the electrical machine can be driven, while limiting the electrical losses. Furthermore, if the conversion system is two-way (reversible), then it is also possible to store (for example in a battery) electrical energy generated by the rotation of the electrical machine.

Comparative Example

Figure 3:
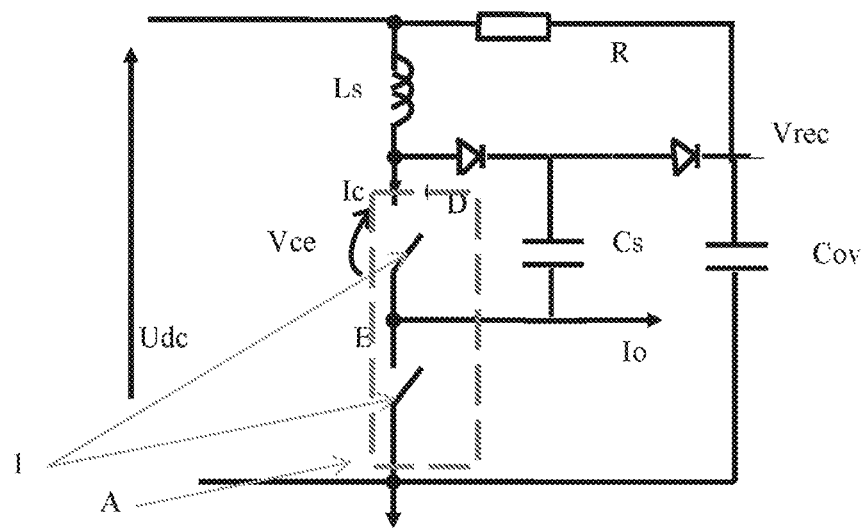
FIG. 3, already described, illustrates a DC/AC converter according to the prior art, with soft switching.
Figure 4:
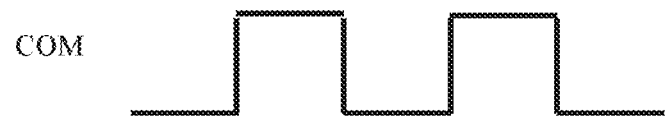
FIG. 4, already described, illustrates the switching signal, the voltage and the current in a phase for a DC/AC converter according to the design of FIG. 3.
Figure 4:
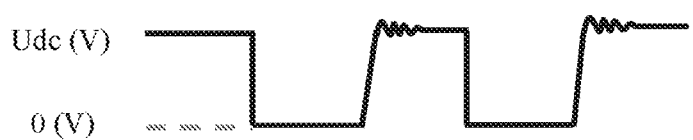
Figure 4:
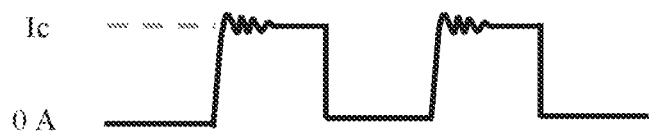

A comparative example has been provided, so as to compare the losses of the conversion system according to the invention with the losses of the DC/AC conversion systems according to the prior art. The system according to the invention tested corresponds to the embodiment of FIG. 5a (electrical energy recovery), each switching arm being formed by a power module according to the example of FIG. 6 (power module). The DC/AC conversion systems of the prior art correspond respectively to the hard switching and to the soft switching, respectively, according to the embodiments of FIGS. 1 and 3.

For this example, the values used for an inverter with a rated power of 50 kW, are as follows:
Ls~=300 microH,
Cs~=6.8 nanoF,
Cov~=1410 nanoF (formed by three 470 nF capacitors),
Vrec~=1.5 Vbus,
Lrec=56 microH,
Crec=20 nanoF,
switch type: IGBT.

TABLE 1

| Comparative example | | | | | |
|---|---|---|---|---|---|
| | Power supplied | Total losses | Losses by dissipation in the added circuit | Switching losses | Switching frequency |
| Prior art hard switching (FIG. 1) | 50 kW | 2 kW | 0 kW | 2 kW | 20 khz |
| Prior art soft switching (FIG. 3) | 50 kW | 2 kW | 1 kW | 1 kW | 50 khz |
| Invention (FIG. 5) | 50 kW | 1.15 kW | 0.15 kW | 1 kW | 50 khz |

It will be noted that the conversion system makes it possible to reduce the total losses by approximately 42.5% compared to the conversion systems according to the prior art. This reduction is due to a reduction of the switching losses linked to the soft switching (switching losses reduced by 50% relative to hard switching), and by a reduction of the losses by dissipation in the added circuit (dissipation losses reduced by 85% relative to soft switching).

The invention claimed is:

1. A system for converting direct current into multiple phase alternating current comprising:
at least one power module with each power module being associated with a different alternating phase current;
each power module being configured for connection to a DC source for providing electrical energy to be converted from the DC source into the multiple phase alternating current, the DC source providing a non-reference voltage and a reference voltage, each power module including two switches connected in series and having an input and an output which are respectively connected to the voltages and a common connection between the switches which provides an output phase of the multiple phase alternating current, and the switches are switched to produce the output phase of the multiple phase alternating current;
two diodes connected in series between the voltages, having an output providing energy recovery of switching losses from the switches and are coupled together at a common point;
a first capacitor coupled between the reference voltage and the output of the two diodes which stores energy recovered from the switching losses of the switches;

a second capacitor coupled between the common point of the switches and the common point of the diodes for producing voltage modulation of soft switching losses of the switches; and wherein each power module does not include a resistor coupled between the non-reference voltage and the output phase of alternating current.

2. The system according to claim 1, wherein the switches are either MOSFETs or IGBTs.

3. The system according to claim 1, wherein the second capacitor has a capacitance of between 4 and 15 nF.

4. The system according to claim 2, wherein the second capacitor has a capacitance of between 4 and 15 nF.

5. The system according to claim 1, wherein the first capacitor has a capacitance of between 500 and 5000 nF.

6. The system according to claim 2, wherein the first capacitor has a capacitance of between 500 and 5000 nF.

7. The system according to claim 3, wherein the first capacitor has a capacitance of between 500 and 5000 nF.

8. The system according to claim 4, wherein the first capacitor has a capacitance of between 500 and 5000 nF.

9. The system according to claim 1, wherein the power conversion module is a block configured for mounting on a board of the system.

10. The system according to claim 9, wherein the block comprises means for fixing the block to the power conversion module.

11. The system according to claim 2, wherein the power conversion module is a block configured for mounting on a board of the system.

12. The system according to claim 3, wherein the power conversion module is a block configured for mounting on a board of the system.

13. The system according to claim 4 wherein the power conversion module is a block configured for mounting on a board of the system.

14. The system for converting a direct electrical power in accordance with claim 1, comprising three switching arms with each switching arm comprising a power module.

15. The system according to claim 1, wherein the system comprises at least one current modulation coil for voltage modulation of the soft switching losses.

16. The system in accordance with claim 1, wherein the reference voltage is ground and the non-reference voltage is positive.

17. A system for converting direct current into alternating current comprising:

at least one power module with each power module being associated with the alternating current;

each power module being configured for connection to a DC source for providing electrical energy to be converted from the DC source into the alternating current, the DC source providing a non-reference voltage and a reference voltage, each power module including two switches connected in series and having an input and an output which are respectively connected to the voltages and a common connection between the switches which provides an output of the alternating current, and the switches are switched to produce the alternating current; and two diodes connected in series between the voltages, having an output of the two diodes providing energy recovery of switching losses from the two switches, and being coupled together at a common point;

a first capacitor coupled between the reference voltage and the output of the two diodes which is storage of energy recovered from the switching losses of the two modules;

a second capacitor coupled between the common point of the switches and the common point of the diodes for producing voltage modulation of soft switching losses of the switches; and wherein each power module does not include a resistor coupled between the non-reference voltage and the output of the alternating current.

18. The system according to claim 17, in which the switches are either MOSFETs or IGBTs.

19. The system according to claim 17, wherein the second capacitor has a capacitance of between 4 and 15 nF.

20. The system according to claim 18, wherein the second capacitor has a capacitance of between 4 and 15 nF.

21. The system according to claim 17, wherein the first capacitor has a capacitance of between 500 and 5000 nF.

22. The system according to claim 18, wherein the first capacitor has a capacitance of between 500 and 5000 nF.

23. The system according to claim 19 wherein the first capacitor has a capacitance of between 500 and 5000 nF.

24. The system according to claim 20, wherein the first capacitor has a capacitance of between 500 and 5000 nF.

25. The system according to claim 16, wherein the power conversion module is a block configured for mounting on a board of the system.

26. The system according to claim 25, wherein the block comprises means for fixing to the power conversion module.

27. The system according to claim 1, wherein the system comprises at least one current modulation coil.

28. The system according to claim 2, wherein the system comprises at least one current modulation coil.

29. The system according to claim 3, wherein the system comprises at least one current modulation coil.

30. The system according to claim 17, wherein the system comprises at least one current modulation coil.

31. The system according to claim 18, wherein the system comprises at least one current modulation coil.

32. The system according to claim 19, wherein the system comprises at least one current modulation coil.

33. The system according to claim 21, wherein the system comprises at least one current modulation coil.

34. The system in accordance with claim 17, wherein the reference voltage is ground and the non-reference voltage is positive.

* * * * *